Figure 1:
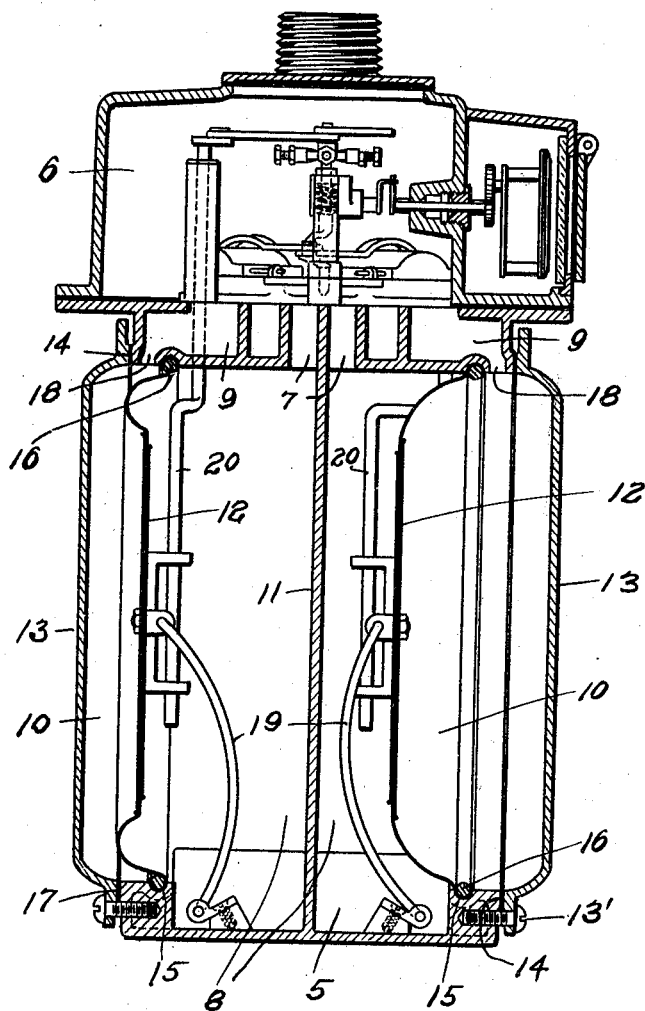

April 7, 1931.                H. CHRISMAN                    1,799,546
                                METER
                         Filed Sept. 4, 1926     3 Sheets-Sheet 1

INVENTOR
Horace Chrisman
BY Green and McCallister
His ATTORNEYS.

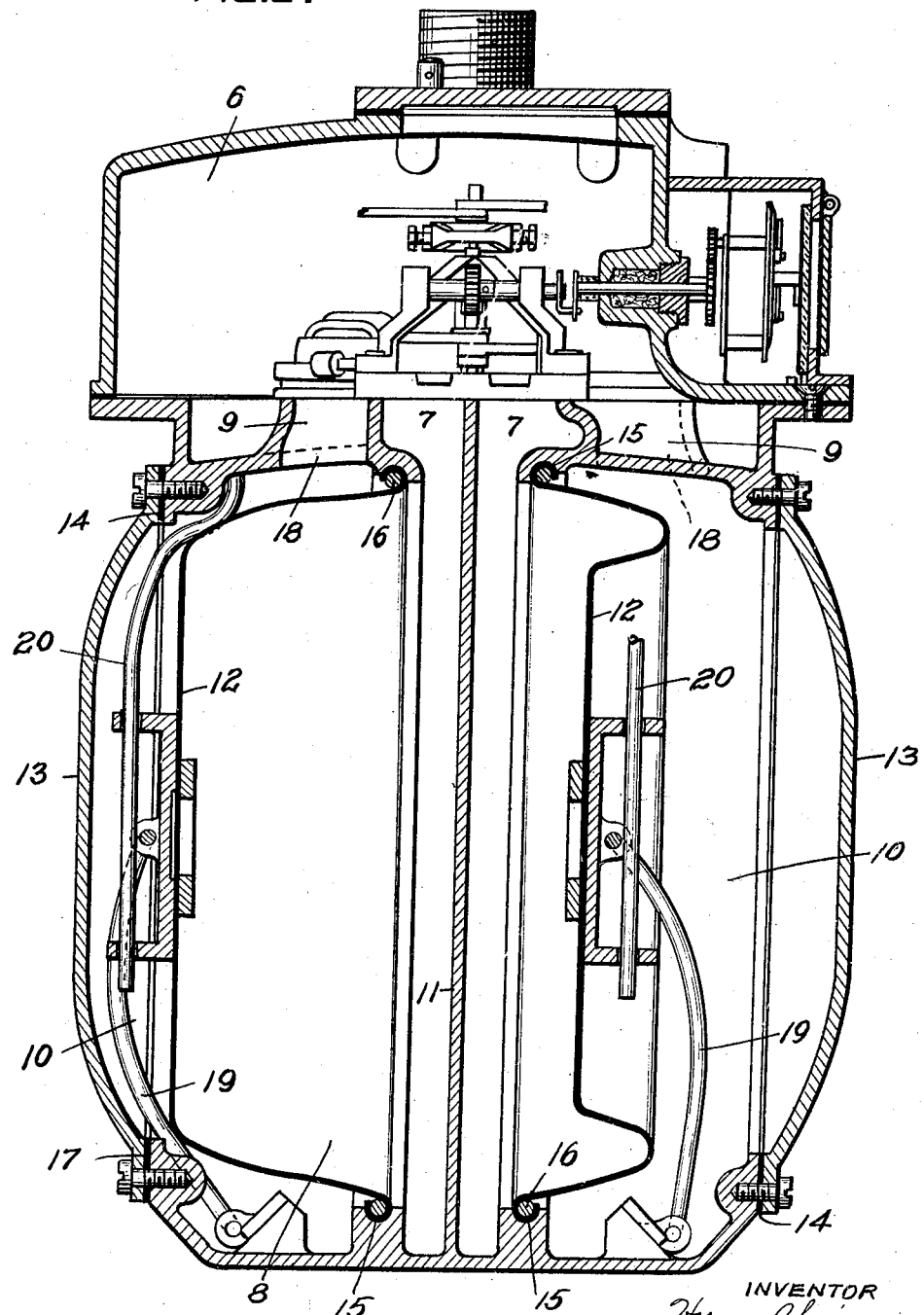

April 7, 1931. H. CHRISMAN 1,799,546
METER
Filed Sept. 4, 1926 3 Sheets-Sheet 3
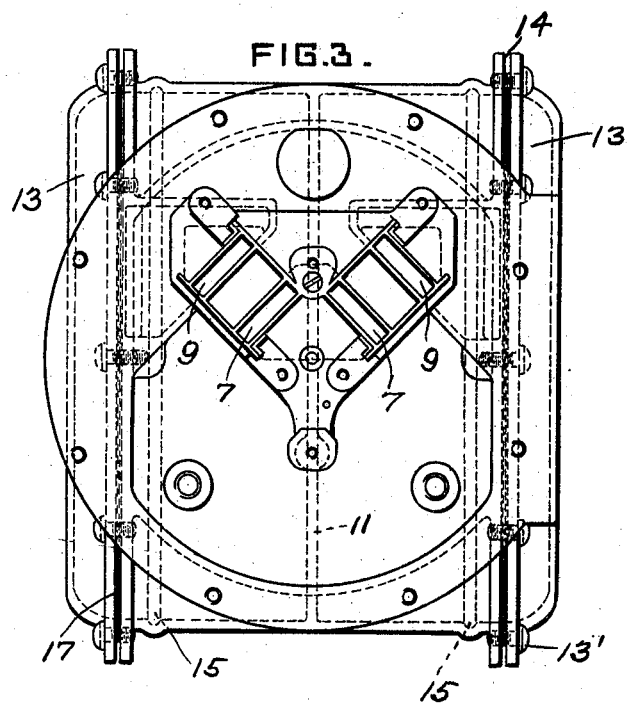
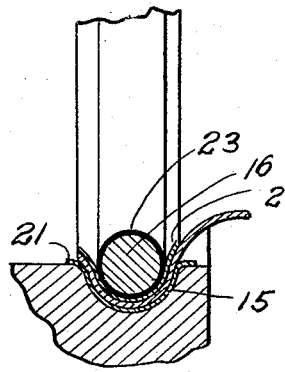
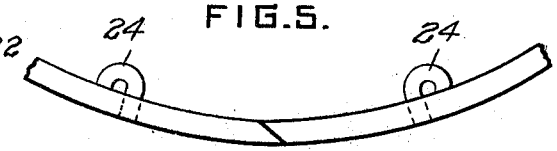
INVENTOR
Horace Chrisman
BY Green and McCallister
His ATTORNEYS.

Patented Apr. 7, 1931

1,799,546

UNITED STATES PATENT OFFICE

HORACE CHRISMAN, OF EDGEWOOD, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

METER

Application filed September 4, 1926. Serial No. 133,621.

This invention relates to meters and more particularly to cast-iron gas meters of the type employing diaphragms which are actuated by the flow of fluid through the meter to operate an associated registering mechanism.

It has heretofore been customary to so construct meters having cast casings that the diaphragms are held in place by having their flexible peripheries clamped between the circular faces of the cast meter body and the engaging faces or flanges of the cast covers, each of which cooperates with an associated diaphragm in enclosing one of the measuring chambers of the meter. One of the disadvantages resulting from this construction is occasioned by the fact that the material from which the flexible portion of the diaphragms are constructed is sufficiently porous to permit seepage of distillate and gas through the joint between the face of the meter and the cover in which joint the diaphragm acts as a gasket.

An object of this invention is to provide a meter having a cast body of such construction and arrangement that no seepage of distillate or gas can take place between the meter body and its covers.

A further object is to provide a cast-iron meter of such construction and arrangement as to eliminate the use of diaphragms as gaskets between the covers and the meter case body.

With the old or usual method of holding the diaphragms it is necessary to so form the gas passages from the distributing chamber to the outer measuring chambers that they extend through the face of the meter body, through an opening cut in the diaphragm gasket and through a channel or passage formed in the cover. Such a construction produces a somewhat indirect path for the gas and is subject to the further disadvantage in assembling, that the openings in the diaphragms must be accurately aligned with the associated passages in the meter body and in the cover so that no reduction in the size of the gas port and passages will be made.

A still further object of the invention is to produce a meter having a cast body, in which the covers are materially simplified both from the standpoint of manufacture and the standpoint of shape and in which substantially direct gas passages are formed between the distributing chamber and the outer measuring chambers.

A still further object is to provide a cast-iron meter of the type set forth wherein the support and flag wires may be positioned on either side of the associated diaphragm.

A still further object is to provide a meter of simple, rugged construction which will be easy to manufacture and assemble and positive and dependable in operation.

These and other objects which will be apparent to those skilled in this particular art are attained by means of the invention illustrated in the accompanying drawings, wherein Figure 1 is a transverse sectional view illustrating the application of this invention to one form of gas meter. Fig. 2 is a similar view showing a modification of the invention; and Fig. 3 is a top plan view of the meter shown in Fig. 1; and Fig. 4 is an enlarged fragmental sectional view of the means employed for securing the outer edges of the diaphragms. Figure 5 is a fragmental view of the means for contracting the snap rings for assembling and disassembling.

In the particular meter constructions which have been chosen for the purpose of illustrating the present invention the diaphragms are supported within the meter body and in spaced relation to the faces of the meter body against which the usual covers are clamped.

The meter body is provided with circular turned or machined grooves extending around the interior thereof in spaced relation to the faces of the body. The flexible leather peripheries of the diaphragms are clamped in the diaphragm receiving grooves by means of metal snap rings which press the associated diaphragms into the grooves in such a way as to hold them in place and prevent leakage of gas through the joint from one side of the diaphragm to the other. It is essential to make each groove continuous, true and accurate in order to avoid irregularities which would not be filled by the leather diaphragm under the moderate pressure encountered. This can only be accomplished in a one piece body portion as shown. Such a construction eliminates the use of the diaphragms as gaskets between the covers and cover engaging faces of the body portion, thus permitting the use of such non-porous gaskets as will prevent the seepage of any distillate or gas through the cover joint. With this improved construction the gas passages connecting the distributing chamber with the outside measuring chambers can be so constructed as to enter the respective measuring chambers at points between the diaphragms and the cover engaging faces of the body so that it is not necessary to form such passages through such faces and the gaskets employed for sealing the cover joints. The present invention also employs means for preventing deterioration of the leather diaphragm, due to its contact with the cast-iron body. Such deterioration of the leather diaphragms has hitherto occasioned a serious difficulty and is caused by the so called "tannin of iron" which occurs whenever leather and iron are brought into contact.

As illustrated in the accompanying drawings, this invention is shown in connection with a meter body 5 having the usual distributing chamber 6 connected by gas passages 7 with inner measuring chambers 8 and also connected by gas passages 9 with outer measuring chambers 10. A central partition 11 separates the two inner measuring chambers, and diaphragms 12 are provided for separating the inner and outer measuring chambers. Each diaphragm cooperates with an associated cover 13 in enclosing an outer measuring chamber and the covers are clamped to the annular faces 14 of the meter case body by means of a ring of screws or bolts 13′ which clamp the cover in sealing relation with separate impervious gaskets 17.

In the present invention the interior of the meter body is provided with circular diaphragm receiving grooves in which the flexible peripheries of the diaphragms 12 are clamped by split snap rings 16 which are so formed as to yieldingly hold the diaphragm peripheries in engagement with the grooves 15 with sufficient pressure to prevent leakage of gas from one side of the diaphragms to the other during normal operation thereof. The grooves must be smooth, and accurate throughout their length and their continuity must not be interrupted by joints or sections in the element in which they are formed. I, therefore, form the body in one piece so that the grooves may be turned therein and finished so as to present an uninterrupted smooth surface to the leather diaphragms. It is apparent that with such a construction a gas and liquid tight gasket 17 can be employed between the covers and the meter faces and thereby eliminate all seepage of distillate or gas which takes place through the cover joints when the diaphargm is so clamped.

The ports 18, through which the respective gas passages 9 communicate with the outer measuring chambers 10, are located between the associated diaphragms and adjacent meter faces so that all necessity for forming these passages through the meter faces and through the diaphragms and covers is eliminated.

With this construction of meter each diaphragm can be placed either in back of the associated guide wires 19 as shown in Fig. 2, or in front of such wires as shown in Fig. 1. When the diaphragms are placed back of the guide wires 19 and flag wires 20 the restricted channels to the interior measuring chambers, hitherto commercially employed, are eliminated, thus balancing the operation of the diaphragms and simplifying the meter casting. When the diaphragm is supported in front of the flag and guide wires, as shown in Fig. 1, they are rendered more accessible for repairs. It will be apparent that either form of diaphragm mounting can be employed with equal facility as a result of the present invention.

In order to eliminate all possibility of the action known as "tannin of iron" taking place so as to injure and ultimately destroy the leather diaphragms, paper gaskets 21 are provided between the grooves 15 and the associated diaphragms 12 and similar gaskets 22 may be positioned between the diaphragms and the snap rings 16, or the latter may be enclosed in fiber sheaths 23 in which case the inner gaskets 22 are not necessary. In this way the destruction of the leather diaphragms caused by contact with the cast-iron body and the metal of the snap ring is prevented so as to substantially reduce the cost of maintenance and prolong the life of the diaphragm.

As heretofore stated, grooves 15 must be accurately formed so that they will present no irregularities which will not be filled by the leather of the diaphragm peripheries under the moderate pressure encountered. If any such irregularities are present a gas tight joint will not be obtained and the operation of the meter will be rendered inaccurate. Each snap ring 16 is provided with means to be engaged by a suitable instrument for contracting the same for the purpose of assembling and disassembling. As illustrated, such means includes hooks 24 or the like formed adjacent the splits in the rings so that the latter may be contracted by means of suitable instruments.

The present invention also provides a form of yieldable diaphragm mounting which is gas tight up to a pressure of about two pounds. Should the pressure, for any reason, exceed such an amount the diaphragms will be pulled from beneath the snap rings 16 without injury and in this way provide, in effect, safety valves for the meter besides providing a means for indicating when the meter has been subjected to excess pressure.

Although I have described a specific form of meter construction it will be apparent to those skilled in the art that various changes, additions, substitutions and omissions may be made therein without departing from the spirit of this invention or the scope of the appended claims.

What I claim as new and desire to secure by Letters Patent is:

1. The combination, in a gas meter, of a cast body portion enclosing measuring chambers and provided with two smooth annular diaphragm-receiving grooves cut in a continuous annular inner face thereof, covers for said measuring chambers, said diaphragm-receiving grooves being spaced inwardly from said covers, diaphragms having flexible peripheral portions engaging said grooves, and a separate snap ring for each diaphragm clamping the periphery thereof within its groove with a moderate degree of pressure to cooperate with said covers in forming measuring chambers, whereby excessive pressure in said meter will pull said diaphragms from beneath said snap rings without injury thereto.

2. The combination in a gas meter of a diaphragm, said meter having an annular groove therein, a paper gasket within said groove, a snap ring for clamping the periphery of said diagram within said groove against said gasket with a moderate degree of pressure and a fibre sheath enclosing said snap ring.

3. The combination in a gas meter, of a cast body portion enclosing measuring chambers and provided with two smooth annular, diaphragm-receiving grooves cut in a continuous annular inner face thereof, diaphragms having flexible peripheral portions, each engaging one of said grooves, and a separate snap ring provided with tool receiving projections yieldingly holding the peripheral portion of each diaphragm in one of said grooves.

4. A gas meter having in combination, a cast body enclosing a measuring chamber and provided with a smooth continuous annular groove cut in an inner continuous face thereof, a cover for said body portion, said cover and said body portion being provided with securing means spaced from said annular groove, a leather diaphragm having a flexible peripheral portion for engagement with said annular groove, a snap ring for clamping the flexible periphery of said diaphragm within said groove with a moderate degree of pressure, and a protective gasket between said diaphragm and said groove to prevent the destructive deterioration of said leather gasket by the action of said cast iron body thereon.

5. In combination, a gas meter, having a body portion enclosing a measuring chamber and provided with an annular diaphragm, said body having a smooth receiving groove in the inner face thereof, said diaphragm having a flexible peripheral portion engaging said groove, a protective gasket within said groove between said diaphragm and said groove and a snap ring provided with two tool engaging projections and yieldingly holding the peripheral portion of said diaphragm in said groove with a moderate degree of pressure.

In testimony whereof, I have hereunto subscribed my name this 30th day of August, 1926.

HORACE CHRISMAN.